(12) United States Patent
Zhang et al.

(10) Patent No.: US 12,389,020 B2
(45) Date of Patent: Aug. 12, 2025

(54) TRIANGULATION METHODS WITH BOUNDARY INFORMATION FOR DYNAMIC MESH COMPRESSION

(71) Applicant: TENCENT AMERICA LLC, Palo Alto, CA (US)

(72) Inventors: Xiang Zhang, Sunnyvale, CA (US); Chao Huang, Palo Alto, CA (US); Jun Tian, Palo Alto, CA (US); Xiaozhong Xu, State College, PA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 50 days.

(21) Appl. No.: 18/185,117

(22) Filed: Mar. 16, 2023

(65) Prior Publication Data

US 2023/0319293 A1 Oct. 5, 2023

Related U.S. Application Data

(60) Provisional application No. 63/327,209, filed on Apr. 4, 2022.

(51) Int. Cl.
*H04N 19/20* (2014.01)
*G06T 17/20* (2006.01)
*H04N 19/132* (2014.01)

(52) U.S. Cl.
CPC ........... *H04N 19/20* (2014.11); *G06T 17/205* (2013.01); *H04N 19/132* (2014.11)

(58) Field of Classification Search
None
See application file for complete search history.

(56) References Cited

U.S. PATENT DOCUMENTS

| | | | | |
|---|---|---|---|---|
| 5,546,515 A | * | 8/1996 | Mochizuki | G06T 15/55 345/606 |
| 6,577,310 B1 | * | 6/2003 | Kim | G06T 9/001 375/E7.084 |
| 6,668,091 B1 | * | 12/2003 | Kim | G06T 9/001 382/241 |
| 10,846,926 B2 | * | 11/2020 | Sun | G06T 17/20 |
| 2010/0328311 A1 | * | 12/2010 | Lakshmanan | G06T 17/20 345/427 |
| 2017/0061036 A1 | * | 3/2017 | Schmidt | G06F 30/20 |
| 2018/0095276 A1 | * | 4/2018 | Ng-Thow-Hing | G02B 27/017 |
| 2019/0030886 A1 | * | 1/2019 | Ingram | B41M 5/0088 |

(Continued)

OTHER PUBLICATIONS

International Search Report dated Jun. 22, 2023 in Application No. PCT/US23/15603.

(Continued)

*Primary Examiner* — Mohammad J Rahman
(74) *Attorney, Agent, or Firm* — Sughrue Mion, PLLC

(57) ABSTRACT

A method and apparatus that receives a coded video bitstream from an encoder; retrieves, from the coded video bitstream, a mesh including a plurality of polygons that describe a surface of a volumetric object; triangulates one or more vertices of the mesh, the one or more vertices are located on a boundary of the mesh or interior of the mesh; infers connectivity information between the one or more vertices using the triangulation of the one or more vertices; and reconstructs one or more boundary UV coordinates based on the connectivity information.

20 Claims, 14 Drawing Sheets

(56) References Cited

U.S. PATENT DOCUMENTS

| | | | |
|---|---|---|---|
| 2019/0088013 A1* | 3/2019 | Baeli | G06T 17/205 |
| 2019/0378332 A1* | 12/2019 | Sun | G06T 17/20 |
| 2020/0349758 A1* | 11/2020 | Paulson | G06T 15/04 |
| 2021/0069580 A1* | 3/2021 | Novak | A63F 9/1288 |
| 2021/0225075 A1 | 7/2021 | Szilagyi et al. | |
| 2021/0233282 A1 | 7/2021 | Kim et al. | |
| 2021/0264667 A1* | 8/2021 | Herpin | G06T 17/10 |
| 2022/0138900 A1* | 5/2022 | Tanaka | G06T 3/40 |
| | | | 345/428 |
| 2022/0164994 A1* | 5/2022 | Joshi | G06T 17/205 |
| 2022/0189116 A1* | 6/2022 | Bloesch | G06T 7/55 |
| 2022/0410002 A1* | 12/2022 | Kokins | G06T 15/20 |
| 2023/0074094 A1* | 3/2023 | Hertzmann | G06T 17/20 |
| 2023/0154051 A1* | 5/2023 | Tang | G06T 17/30 |
| | | | 382/232 |

OTHER PUBLICATIONS

Written Opinion of the International Searching Authority dated Jun. 22, 2023 in Application No. PCT/US23/15603.

* cited by examiner

TRIANGULATION METHODS WITH BOUNDARY INFORMATION FOR DYNAMIC MESH COMPRESSION

CROSS-REFERENCE TO RELATED APPLICATION

This application claims priority from U.S. Provisional Application No. 63/327,209, filed on Apr. 4, 2022, the disclosure of which is incorporated herein by reference in its entirety.

TECHNICAL FIELD

This disclosure is directed to a set of advanced video coding technologies. More specifically, the present disclosure is directed to triangulation methods with boundary information for dynamic mesh compression.

BACKGROUND

The advances in 3D capture, modeling, and rendering have promoted the ubiquitous presence of 3D contents across several platforms and devices. Nowadays, it is possible to capture a baby's first step in one continent and allow the grandparents to see (and maybe interact) and enjoy a full immersive experience with the child in another continent. Nevertheless, in order to achieve such realism, models are becoming ever more sophisticated, and a significant amount of data is linked to the creation and consumption of those models. 3D meshes are widely used to represent such immersive contents.

A dynamic mesh sequence may require a large amount of data since it may consist of a significant amount of information changing over time. Therefore, efficient compression technologies are required to store and transmit such contents. Mesh compression standards IC, MESHGRID, FAMC were previously developed by MPEG to address dynamic meshes with constant connectivity and time varying geometry and vertex attributes. However, these standards do not take into account time varying attribute maps and connectivity information. DCC (Digital Content Creation) tools usually generate such dynamic meshes. In counterpart, it is challenging for volumetric acquisition techniques to generate a constant connectivity dynamic mesh, especially under real time constraints. This type of contents is not supported by the existing standards. MPEG is planning to develop a new mesh compression standard to directly handle dynamic meshes with time varying connectivity information and may include time varying attribute maps. This standard targets lossy, and lossless compression for various applications, such as real-time communications, storage, free viewpoint video, AR and VR. Functionalities such as random access and scalable/progressive coding are also considered.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

The present disclosure provides triangulation methods with boundary information for dynamic mesh compression.

According to some embodiments, there is provided a method performed by at least one processor. The method includes receiving a coded video bitstream from an encoder. The method further includes retrieving, from the coded video bitstream, a mesh including a plurality of polygons that describe a surface of a volumetric object. The method further includes triangulating one or more vertices of the mesh, the one or more vertices are located on a boundary of the mesh or interior of the mesh. The method further includes inferring connectivity information between the one or more vertices using the triangulation of the one or more vertices. The method further includes reconstructing one or more boundary UV coordinates based on the connectivity information.

According to some embodiments, an apparatus includes at least one memory configured to store program code and at least one processor configured to read the program code and operate as instructed by the program code. The program code includes receiving code configured to cause the at least one processor to receive a coded video bitstream from an encoder. The program code further includes retrieving code configured to cause the at least one processor to retrieve, from the coded video bitstream, a mesh including a plurality of polygons that describe a surface of a volumetric object. The program code further includes triangulating code configured to cause the at least one processor to triangulate one or more vertices of the mesh, the one or more vertices are located on a boundary of the mesh or interior of the mesh. The program code further includes inferring code configured to cause the at least one processor to infer connectivity information between the one or more vertices using the triangulation of the one or more vertices. The program code further includes reconstructing code configured to cause the at least one processor to reconstruct one or more boundary UV coordinates based on the connectivity information.

According to some embodiments, a non-transitory computer-readable storage medium, stores instructions that, when executed by at least one processor, cause the at least one processor to receive a coded video bitstream from an encoder. The instructions further cause the at least one processor to retrieve, from the coded video bitstream, a mesh including a plurality of polygons that describe a surface of a volumetric object. The instructions further cause the at least one processor to triangulate one or more vertices of the mesh, the one or more vertices are located on a boundary of the mesh or interior of the mesh The instructions further cause the at least one processor to infer connectivity information between the one or more vertices using the triangulation of the one or more vertices. The instructions further cause the at least one processor to reconstruct one or more boundary UV coordinates based on the connectivity information.

Additional embodiments will be set forth in the description that follows and, in part, will be apparent from the description, and/or may be learned by practice of the presented embodiments of the disclosure.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
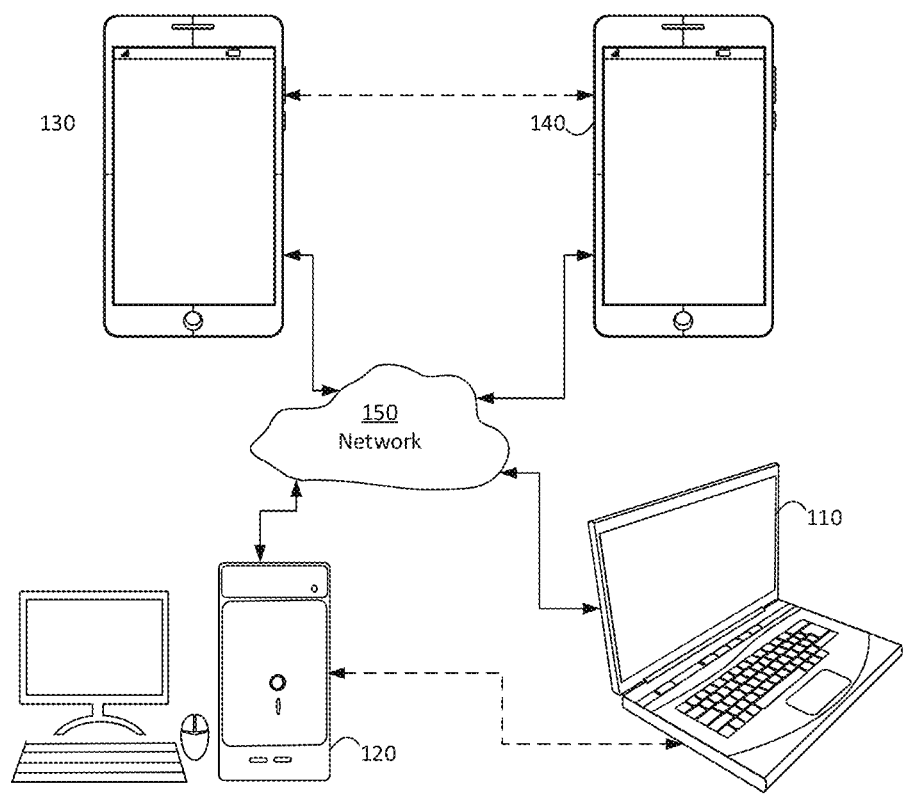
FIG. 1 is a schematic illustration of a simplified block diagram of a communication system, according to some embodiments.

The following detailed description of example embodiments refers to the accompanying drawings. The same reference numbers in different drawings may identify the same or similar elements.

A mesh may include several polygons that describe the surface of a volumetric object. Its vertices in 3D space and the information of how the vertices are connected may define each polygon, referred to as connectivity information. Vertex attributes, such as colors, normals, etc., may be associated with the mesh vertices. Attributes may also be associated with the surface of the mesh by exploiting mapping information that parameterizes the mesh with 2D attribute maps. In some embodiments, the connectivity information may include information regarding the vertices in 3D space of a polygon, and may describe, specify, or otherwise indicate the relative location of the vertices with respect to each other, and/or how the vertices may be connected. Such mapping may be defined using a set of parametric coordinates, referred to as UV coordinates or texture coordinates, and associated with the mesh vertices. 2D attribute maps may be used to store high resolution attribute information such as texture, normals, displacements etc. The high resolution attribute information may be used for various purposes such as texture mapping and shading.

As stated above, a 3D mesh or dynamic meshes may require a large amount of data since it may consist of a significant amount of information changing over time. In particular, the boundary information is a significant part of the entire mesh. Therefore, efficient compression technologies are required to store and transmit such contents. In the framework of 2D atlas sampling based method, one important procedure is to infer the connectivity information from the sampled vertices plus boundary vertices on decoder side. This is a major part in decoding process, and the focus of this disclosure.

In this disclosure, a number of methods are proposed for dynamic mesh compression. The methods may be applied individually or by any form of combinations. Also, the methods may be applied to static meshes, where there is only one frame of the mesh or the mesh content does not change over time.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

The connectivity information may be inferred from the boundary vertices and the sampled vertices for each chart on decoder side. The orientation of inferred triangles (clockwise or counterclockwise) may be either signaled for all charts in high-level syntax, such as sequence header, slice header, etc., or fixed (assumed) by encoder and decoder. The orientation of inferred triangles may be also signaled differently for each chart.

The reconstructed mesh may have different connectivity from the original mesh. For example, the original mesh is a triangle mesh, while the reconstructed mesh may be a polygonal mesh (e.g., quad mesh).

Figure 2:
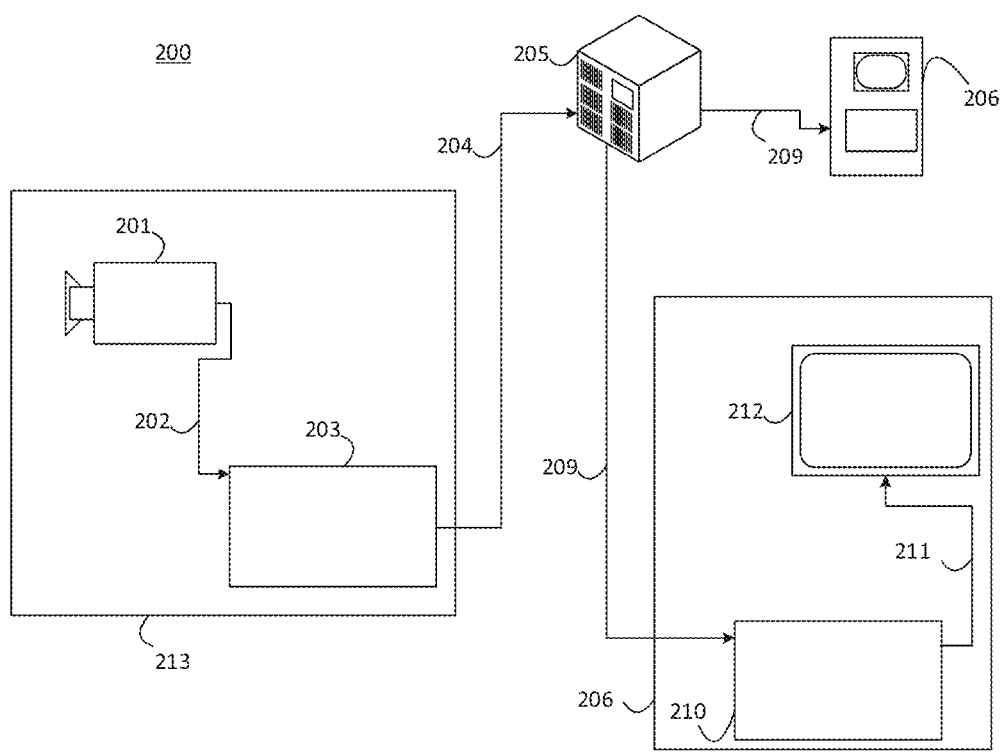
FIG. 2 is a schematic illustration of a simplified block diagram of a streaming system, according to some embodiments.

With reference to FIGS. 1-2, an embodiment of the present disclosure for implementing encoding and decoding structures of the present disclosure are described.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include mesh data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 may create, for example, a stream 202 that includes a 3D mesh and metadata associated with the 3D mesh. The video source 201 may include, for example, 3D sensors (e.g. depth sensors) or 3D imaging technology (e.g. digital camera(s)), and a computing device that is configured to generate the 3D mesh using the data received from the 3D sensors or the 3D imaging technology. The sample stream 202, which may have a high data volume when compared to encoded video bitstreams, may be processed by the encoder 203 coupled to the video source 201. The encoder 203 may include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, may be stored on a streaming server 205 for future use. One or more streaming clients 206 may access the streaming server 205 to retrieve video bit streams 209 that may be copies of the encoded video bitstream 204.

The streaming clients 206 may include a video decoder 210 and a display 212. The video decoder 210 can, for example, decode video bitstream 209, which is an incoming copy of the encoded video bitstream 204, and create an outgoing video sample stream 211 that may be rendered on the display 212 or another rendering device (not depicted). In some streaming systems, the video bitstreams 204, 209 may be encoded according to certain video coding/compression standards.

Figure 3:
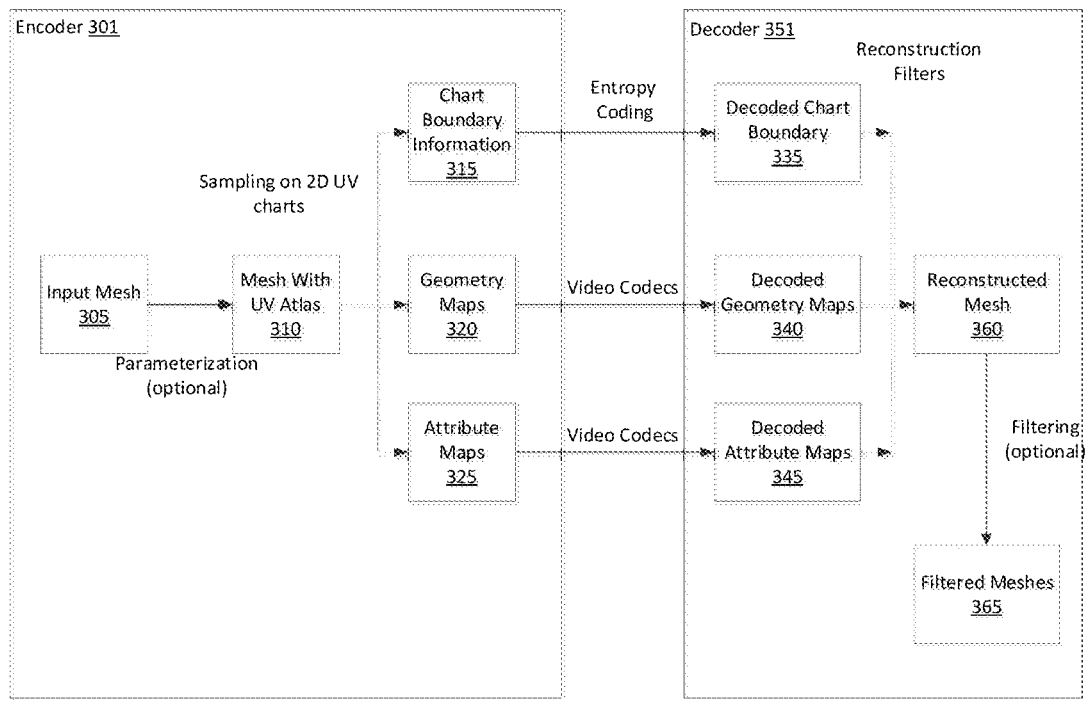
FIG. 3 is a schematic illustration of a simplified block diagram of a video encoder and decoder, according to some embodiments.

FIG. 3 is an exemplary diagram of framework 300 for dynamic mesh compression and mesh reconstruction using encoders and decoders. Each frame of the input meshes may be preprocessed by a series of operations, e.g., tracking, remeshing, parameterization, voxelization. These operations may be encoder-only, meaning they might not be part of the decoding process. After that, one may get the meshes with 2D UV atlases, where each vertex of the mesh has one or more associated UV coordinates on the 2D atlas. Then, the meshes may be converted to multiple maps, including the occupancy maps, geometry maps and attribute maps, by sampling on the 2D atlas. Then these 2D maps may be coded by any video/image codecs, such as HEVC, VVC, AV1, AVS3, etc. On the decoder side, the meshes may be reconstructed from the decoded 2D maps. Any post-processing and filtering may also be applied on the reconstructed meshes. Other metadata might be signaled to the decoder side for the purpose of 3D mesh reconstruction. The occupancy map may be inferred from the decoder side if the boundary vertices of each chart are signaled.

As seen in FIG. 3, framework 300 may include an encoder 301 and a decoder 351. The encoder 301 may include one or more input mesh 305, one or more mesh with UV atlas 310, chart boundary information 315, geometry maps 320, and attribute maps 325. The decoder 351 may include decoded chart boundary 335, decoded geometry maps 340, decoded attribute maps 345, reconstructed mesh 360, and may include filtered meshes 365.

According to an aspect of the present disclosure, the input mesh 305 may include one or more frames, and each of the one or more frames may be preprocessed by a series of operations and used to generate the mesh with UV atlas 310. As an example, the preprocessing operations may include and may not be limited to tracking, parameterization, remeshing, voxelization, etc. In some embodiments, the preprocessing operations may be performed only on the encoder side and not the decoder side.

The mesh with UV atlas 310 may be a 2D mesh. The 2D mesh with UV atlas may be a mesh in which each vertex of the mesh may be associated with UV coordinates on a 2D atlas. The mesh with the UV atlas 310 may be processed and converted into a plurality of maps based on sampling. As an example, the UV atlas 310 may be processed and converted into occupancy maps, geometry maps, and attribute maps based on sampling the 2D mesh with UV atlas. The geometry maps 320, and attribute maps 325 may be encoded using appropriate codecs (e.g., HVEC, VVC, AV1, etc.) and transmitted to a decoder. In some embodiments, metadata (e.g., connectivity information etc.) may also be transmitted to the decoder.

According to an aspect, the decoder 351 may receive the encoded occupancy maps, geometry maps, and attribute maps from an encoder. The decoder 351 may use appropriate techniques and methods, in addition to embodiments described herein, to decode the chart boundary information, geometry maps, and attribute maps. In an embodiment, decoder 351 may generate decoded chart boundary 335, decoded geometry maps 340, and decoded attribute maps 345. The input mesh 305 may be reconstructed into reconstructed mesh 360 based on the decoded chart boundary information 335, decoded geometry maps 340, and decoded attribute maps 345 using one or more reconstruction filters and techniques. Post-filtering techniques, including but not limited to remeshing, parameterization, tracking, voxelization, etc., may also be applied on the reconstructed mesh 360 to generate filtered meshes 365.

Figure 4:
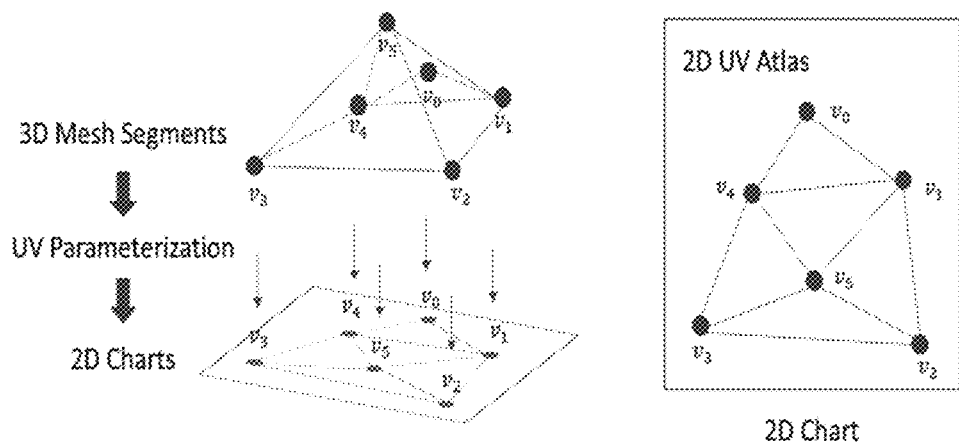
FIG. 4 is an illustration of the process of UV parameterization mapping from 3D mesh segments onto 2D charts, according to some embodiments.

In some embodiments, a 3D mesh may be partitioned into several segments (or patches/charts). Each segment may include a set of connected vertices associated with their geometry, attribute, and connectivity information. As illustrated in FIG. 4, the UV parameterization process maps a mesh segment onto a 2D chart in the 2D UV atlas. Each vertex in the mesh segment will be assigned with a 2D UV coordinates in the 2D UV atlas. The vertices in a 2D chart form a connected component as their 3D counterpart. The geometry, attribute, and connectivity information of each vertex may be inherited from their 3D counterpart as well.

Figure 5:
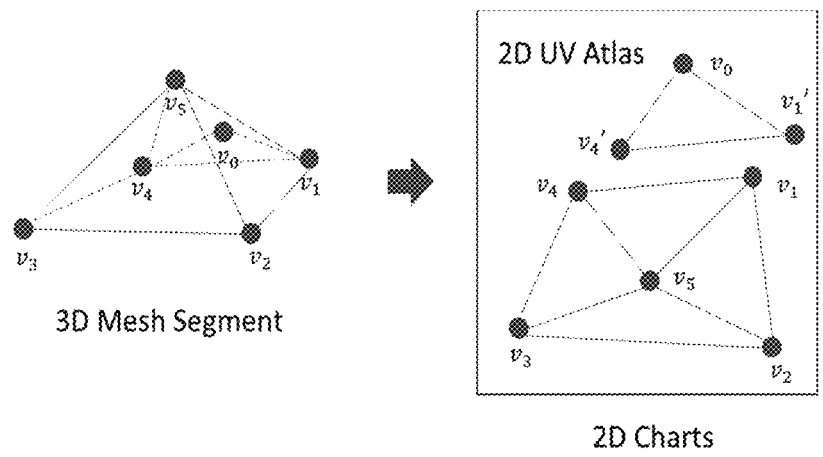
FIG. 5 is an illustration of a different UV parameterization where the 3D mesh segment is mapped to multiple separate charts, according to some embodiments.

A 3D mesh segment may be also mapped to multiple separate 2D charts. In this case, a vertex in 3D could corresponds to multiple vertices in 2D UV atlas. As shown in FIG. 5, the same 3D mesh segment is mapped to 2 2D charts, instead of a single chart, in the 2D UV atlas. 3D vertices v1 and v4 have two 2D correspondences respectively.

Figure 6:
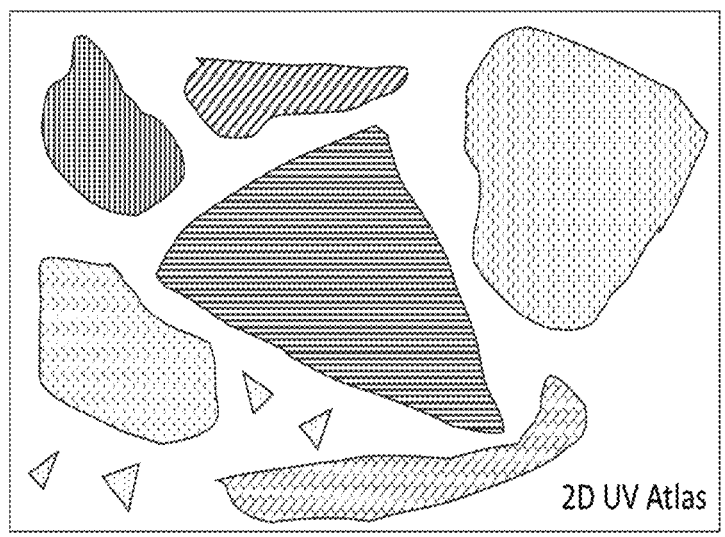
FIG. 6 is a general 2D UV atlas with multiple charts, according to some embodiments.

A general 2D UV atlas of a 3D mesh may consist of multiple charts as shown in FIG. 6, where each chart may contain multiple (usually more than or equal to 3) vertices associated with their 3D geometry, attribute, and connectivity information.

Figure 7:
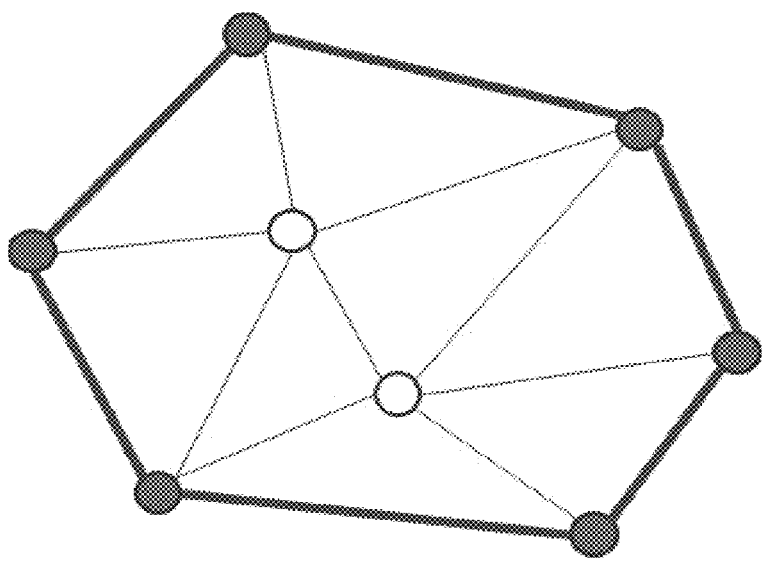
FIG. 7 is an illustration of boundary vertices in a 2D chart, according to some embodiments.

Boundary vertices are defined in the 2D UV space. As shown in FIG. 7, the filled vertices are boundary vertices because they are on the boundary edges of a connected component (a patch/chart). A boundary edge may be determined by checking if the edge is only appeared in one triangle. The following information of boundary vertices is significant and should be signaled in the bitstream.

Geometry information, i.e., the 3D xyz coordinates.

2D UV coordinates.

For the case of that a boundary vertex in 3D corresponds to multiple vertices in 2D UV atlas as shown in FIG. 5, the mapping from 3D XYZ to 2D UV may be one-to-multiple. Therefore, a UV-to-XYZ (or referred to as UV2XYZ) index may be signaled to indicate the mapping function. UV2XYZ is a 1D-array of indices that correspond each 2D uv vertex to a 3D xyz vertex.

Figure 8:
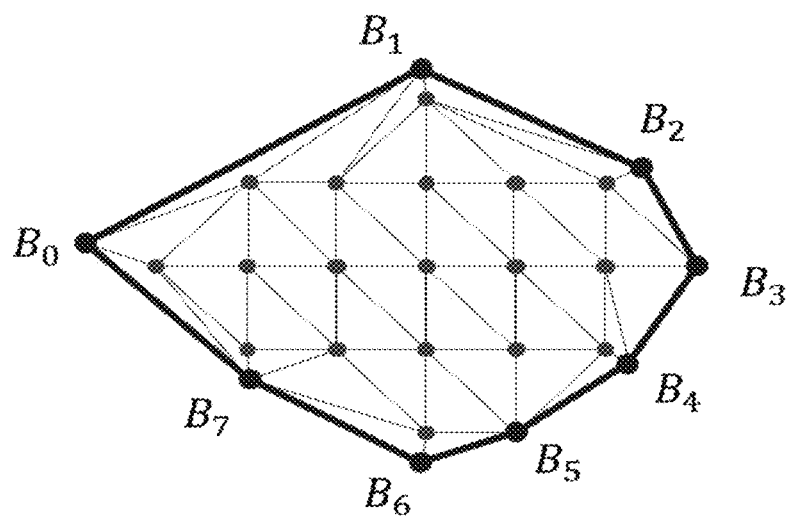
FIG. 8 is an illustration of triangulation with lossless boundary UV vertices and internal sampled vertices, according to some embodiments.

In the case of that the boundary UV coordinates are losslessly coded, there is no duplicate vertices (having the same UV coordinates) on the boundary. Then triangulation methods may be performed on the collection of all the vertices including the exterior boundary vertices and the interior sampled vertices. As shown in FIG. 8, the exterior vertices (shown with larger size) from $B_0$ to $B_7$ are boundary vertices that are coded losslessly, and the interior vertices (shown with smaller size) are sampled vertices.

Interior vertices are vertices inside the polygon which is defined by the exterior boundary vertices in original UV space. Original UV space means all the boundary UV coordinates are reconstructed after being scaled by the sampling rate (sampling step size) and shifted by offsets. All the sampled vertices are on the regular grid of sampling positions, while the boundary vertices may have some offsets relative to the sampling positions.

In some embodiments, the interior sampled vertices do not include the vertices that are on a boundary edge or on a boundary vertex.

Any triangulation method may be applied to create connectivity among the vertices (including boundary vertices and sampled vertices). However, one can use different triangulation methods for boundary vertices and sampled vertices.

Figure 9:
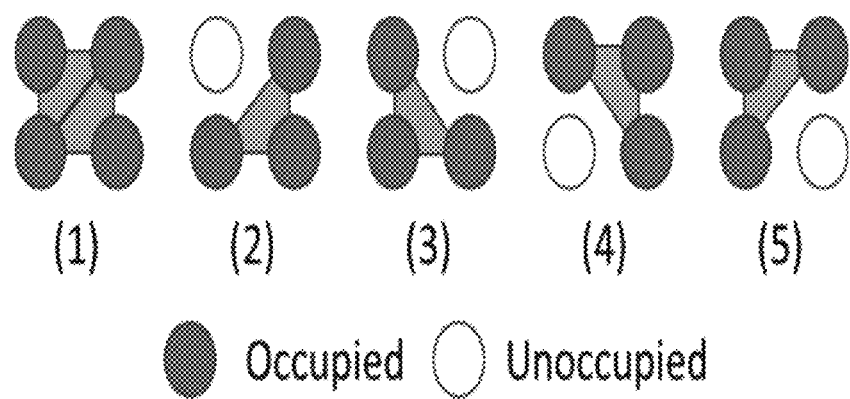
FIG. 9 is an illustration of the connectivity from neighboring points on decoded occupancy maps, according to some embodiments.

In one embodiment, for every 4 neighboring points in the sampled positions, if the number of occupied points is larger than or equal to 3, the connectivity of triangles among the 4 points can be inferred by certain rules. For example, as illustrated in FIG. 9, if 3 out of 4 points are occupied, they may be connected directly to form a triangle; if 4 points are all occupied, they may form two triangles. Different rules may be applied to different number of neighboring points. In this embodiment, the reconstructed mesh is a triangle mesh.

In another embodiment, a quad mesh is reconstructed, when the 4 neighboring points are all occupied.

In a third embodiment, the reconstructed mesh may be a hybrid type, e.g., some regions in the mesh frame generate triangle meshes while other regions generate quad meshes. The connectivity type may be signaled in high-level syntax, such as sequence header, slice header.

Figure 10:
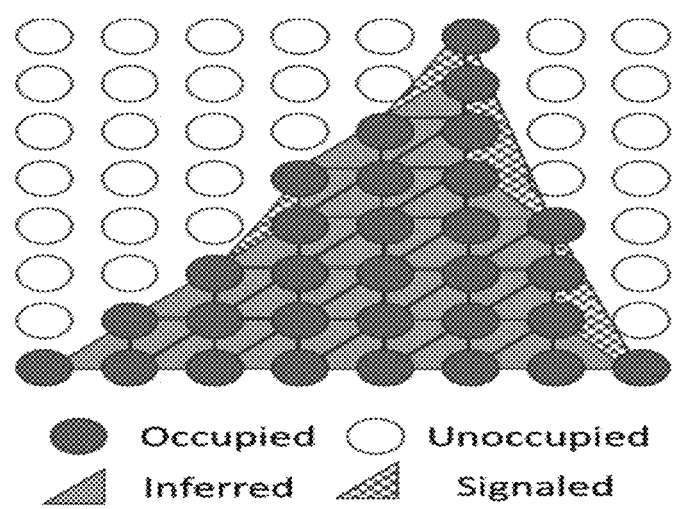
FIG. 10. is an illustration of the connectivity reconstruction from 2D occupancy maps, according to some embodiments.

In some embodiments, the connectivity information may be also reconstructed by explicitly signaling. If a polygon cannot be recovered by implicit rules, the encoder may signal the connectivity information in the bitstream. One may use any means to reduce the overhead of the explicit signaling, such as depending on the boundaries of polygons. As shown in FIG. 10, the connectivity information of triangles is reconstructed by both implicit rules (as shown in FIG. 9) and explicit signaling.

Figure 11:
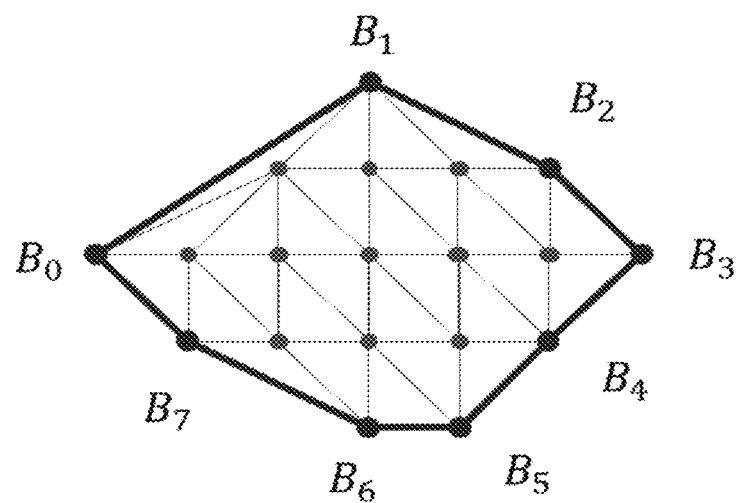
FIG. 11 is an illustration of triangulation with lossy boundary UV vertices and internal sampled vertices, according to some embodiments.

In some embodiments, the boundary UV coordinates may be coded in a lossy way. FIG. 11 shows the case where the boundary UV coordinates reside on sampled positions, where the offsets from the sampled positions are not signaled at all. In another case, the offsets may be signaled after quantization, where the boundary UV coordinates may still have some offsets from the sampled positions. This case may be something similar to the case shown in FIG. 8, but the boundary UV positions may be different than the original ones because the offsets are quantized.

Similar to lossless boundary UV cases, for the lossy boundary UV cases, any triangulation method may be applied to create connectivity between the vertices (including boundary vertices and sampled vertices). One may also use different triangulation methods for boundary vertices and sampled vertices.

However, there might be cases in which the boundary UV coordinates have duplicates because of the lossy coding. In these cases, there might be several boundary vertices having the same UV coordinates. Some special procedures may be applied to deal with this case, otherwise the triangulation methods may be problematic. Let $B_0, B_1, \ldots B_{N-1}$ be the set of boundary UV coordinates reconstructed from decoder side. N is the number of boundary vertices in the chart. There might be duplicated vertices in the set because of lossy compression.

In some embodiments, the duplicate vertices are first removed from the set, the indices of duplicated vertices are recorded. Let $B_0', B_1', \ldots B_{M-1}'$ be the set of unique boundary vertices after removing duplicates, where $M(M \leq N)$ is the number of unique boundary vertices. Denote $I_0, I_1, \ldots, I_{K-1}$ be the indices of the duplicate vertices, where $I_i \in \{0, 1, \ldots, N-1\}$. $K=N-M$ is the number of the duplicates. Then the unique boundary vertices $B_0', B_1', \ldots B_{M-1}'$ along with the internal sampled vertices are fed into triangulation algorithms. Any triangulation algorithm may be applied. Then, additional triangles may be formed for duplicated boundary vertices by different methods. Specifically, for each duplicated boundary vertex, a new triangle is constructed based on its neighboring boundary vertices and the duplicated vertex itself.

In one embodiment, for each $I_i$ (i=0, 1, ..., K-1) of the duplicated vertices, new triangulation is constructed among vertices $B_{I_i}, B_{(I_i-1+N) \% N}, B_{(I_i-2+N) \% N}$.

In another embodiment, for each $I_i$ (i=0, 1, ..., K-1) of the duplicated vertices, new triangulation is constructed among vertices $B_{I_i}, B_{(I_i-1+N) \% N}, B_{(I_i+1+N) \% N}$.

In another embodiment, for each $I_i$ (i=0, 1, ..., K-1) of the duplicated vertices, new triangulation is constructed among vertices $B_{I_i}, B_{(I_i+1+N) \% N}, B_{(I_i+2+N) \% N}$.

As shown in FIG. 11, the reconstructed boundary vertices may be different than the original ones (as shown in FIG. 8) because of lossy compression. The texture maps may be updated to align with the reconstructed boundary UV coordinates. Different interpolation methods may be applied for this purpose. One may refill the texture map by warping every triangles from original position to new position. In one embodiment, one may apply this operation only on the triangles with at least a boundary vertex.

Figure 12:
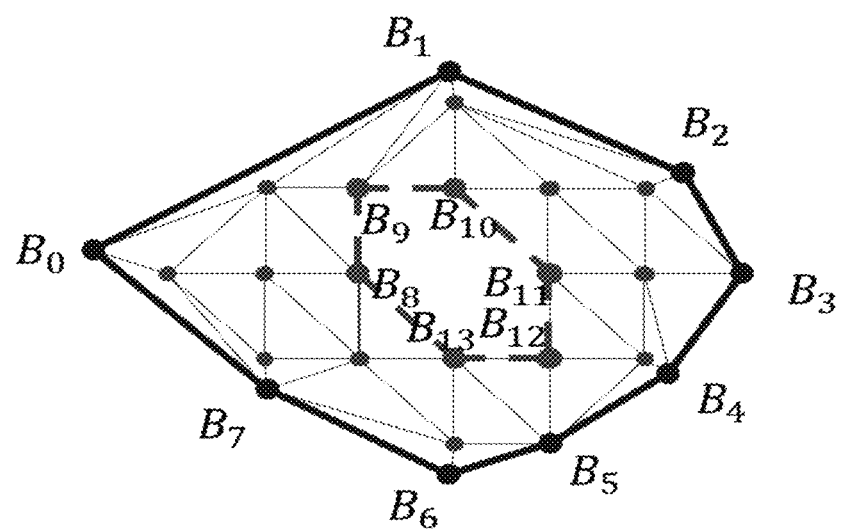
FIG. 12 is an illustration of triangulation with interior boundary vertices.

As shown in FIG. 12, a chart may have holes in the exterior boundary polygon, where the exterior boundary polygon is defined by the exterior boundary vertices ($B_0$, $B_1$, ..., $B_7$). The holes may be signaled and reconstructed by interior boundary vertices ($B_8$, $B_9$, ... $B_{13}$ in FIG. 12). The interior boundary vertices may be either lossless or lossy coded, regardless of how the exterior boundary vertices are coded. In FIG. 12, the exterior boundary vertices are losslessly coded while the interior boundary vertices are lossy coded.

On decoder side, any triangulation method may be applied, but it is intended that the interior boundary vertices will create holes inside the polygon, meaning there is no triangle constructed inside the holes.

Figure 13:
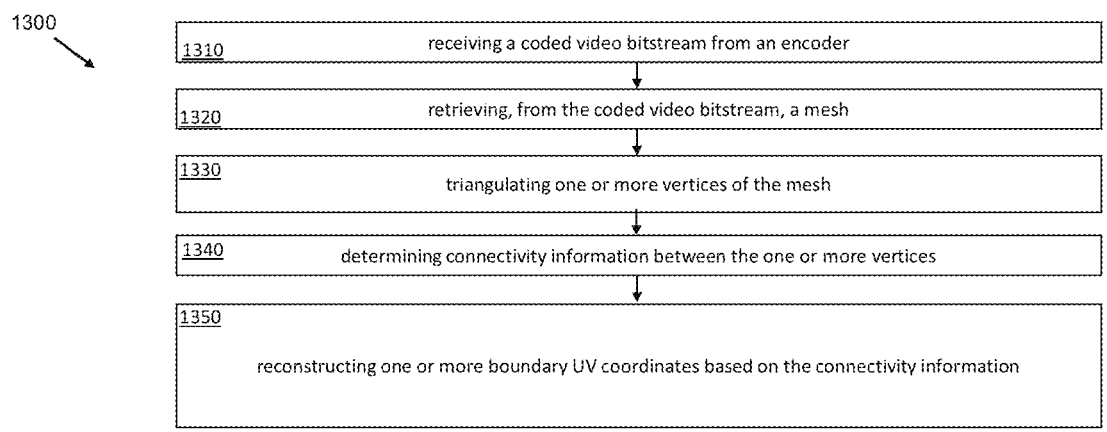
FIG. 13 is operational flowchart illustrating the steps carried out by a program for triangulation with boundary information for dynamic mesh compression, according to some embodiments.

FIG. 13 is a flowchart of example process 1300 for triangulation methods with boundary information for dynamic mesh compression. In some implementations, one or more process blocks of FIG. 13 may be performed by any of the elements discussed above.

As shown in FIG. 13, process 1300 may include receiving a coded video bitstream from an encoder (block 1310).

As further shown in FIG. 13, the process 1300 may include retrieving, from the coded video bitstream, a mesh (block 1320).

As further shown in FIG. 13, the process 1300 may include triangulating one or more vertices of the mesh, the one or more vertices are located on a boundary of the mesh or interior of the mesh (block 1330).

As further shown in FIG. 13, the process 1300 may include determining connectivity information between the one or more vertices using the triangulation of the one or more vertices (block 1340).

As further shown in FIG. 13, the process 1300 may include reconstructing one or more boundary UV coordinates based on the connectivity information (block 1350).

Although FIG. 13 shows example blocks of process 1300, in some implementations, process 1300 may include additional blocks, fewer blocks, different blocks, or differently arranged blocks than those depicted in FIG. 13. Additionally, or alternatively, two or more of the blocks of process 1300 may be performed in parallel.

The techniques, described above, may be implemented as computer software using computer-readable instructions and physically stored in one or more computer-readable media. For example, FIG. 14 shows a computer system 1400 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 14:
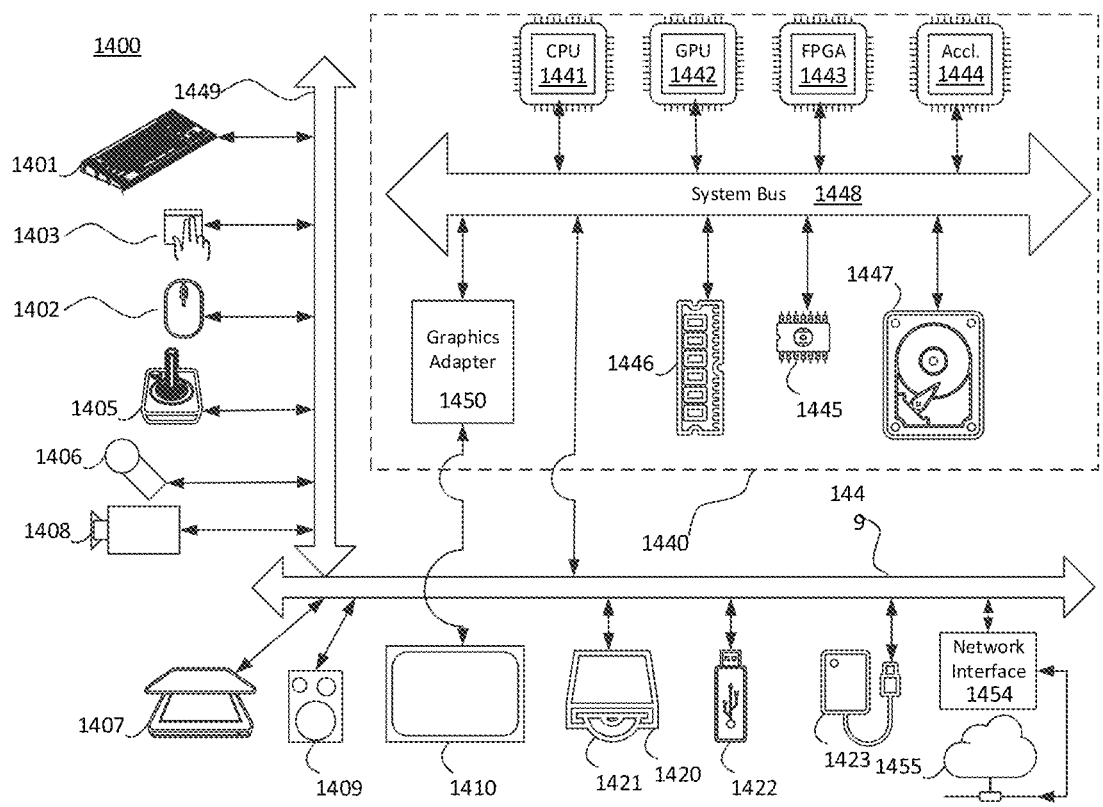
FIG. 14 is a diagram of a computer system suitable for implementing embodiments.

The components shown in FIG. 14 for computer system 1400 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 1400.

Computer system 1400 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices may also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1401, mouse 1402, trackpad 1403, touch screen 1410, data-glove, joystick 1405, microphone 1406, scanner 1407, camera 1408.

Computer system 1400 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1410, data glove, or joystick 1405, but there may also be tactile feedback devices that do not serve as input devices). For example, such devices may be audio output devices (such as: speakers 1409, headphones (not depicted)), visual output devices (such as screens 1410 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1400 may also include human accessible storage devices and their associated media such as optical media including CD/DVD ROM/RW 1420 with CD/DVD or the like media 1421, thumb-drive 1422, removable hard drive or solid state drive 1423, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1400 may also include interface to one or more communication networks. Networks may for example be wireless, wireline, optical. Networks may further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 1449 (such as, for example USB ports of the computer system 1400; others are commonly integrated into the core of the computer system 1400 by attachment to a system bus as described below (for example Ethernet interface into a PC computer system or cellular network interface into a smartphone computer system). Using any of these networks, computer system 1400 may communicate with other entities. Such communication may be uni-directional, receive only (for example, broadcast TV), uni-directional send-only (for example CANbus to certain CANbus devices), or bi-directional, for example to other computer systems using local or wide area digital networks. Such communication may include communication to a cloud computing environment 1455. Certain protocols and protocol stacks may be used on each of those networks and network interfaces as described above.

Aforementioned human interface devices, human-accessible storage devices, and network interfaces 1454 may be attached to a core 1440 of the computer system 1400.

The core 1440 may include one or more Central Processing Units (CPU) 1441, Graphics Processing Units (GPU) 1442, specialized programmable processing units in the form of Field Programmable Gate Areas (FPGA) 1443, hardware accelerators for certain tasks 1444, and so forth. These devices, along with Read-only memory (ROM) 1445, Random-access memory 1446, internal mass storage such as internal non-user accessible hard drives, SSDs, and the like 1447, may be connected through a system bus 1448. In some computer systems, the system bus 1448 may be accessible in the form of one or more physical plugs to enable extensions by additional CPUs, GPU, and the like. The peripheral devices may be attached either directly to the core's system bus 1448, or through a peripheral bus 1449. Architectures for a peripheral bus include PCI, USB, and the like. A graphics adapter 1450 may be included in the core 1440.

CPUs 1441, GPUs 1442, FPGAs 1443, and accelerators 1444 may execute certain instructions that, in combination, may make up the aforementioned computer code. That computer code may be stored in ROM 1445 or RAM 1446. Transitional data may be also be stored in RAM 1446, whereas permanent data may be stored for example, in the internal mass storage 1447. Fast storage and retrieve to any of the memory devices may be enabled through the use of cache memory, that may be closely associated with one or more CPU 1441, GPU 1442, mass storage 1447, ROM 1445, RAM 1446, and the like.

The computer readable media may have computer code thereon for performing various computer-implemented operations. The media and computer code may be those specially designed and constructed for the purposes of the present disclosure, or they may be of the kind well known and available to those having skill in the computer software arts.

As an example and not by way of limitation, a computer system having the architecture of computer system 1400, and specifically the core 1440 may provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 1440 that are of non-transitory nature, such as core-internal mass storage 1447 or ROM 1445. The software implementing various embodiments of the present disclosure may be stored in such devices and executed by core 1440. A computer-readable medium may include one or more memory devices or chips, according to particular needs. The software may cause the core 1440 and specifically the processors therein (including CPU, GPU, FPGA, and the like) to execute particular processes or particular parts of particular processes described herein, including defining data structures stored in RAM 1446 and modifying such data structures according to the processes defined by the software. In addition or as an alternative, the computer system may provide functionality as a result of logic hardwired or otherwise embodied in a circuit (for example: accelerator 1444), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by at least one processor in a decoder, the method comprising:
   receiving a coded video bitstream;
   retrieving, from the coded video bitstream, a mesh including a plurality of polygons that describe a surface of a volumetric object;
   triangulating one or more vertices of the mesh, wherein the one or more vertices are located on a boundary of the mesh or an interior of the mesh, and the boundary of the mesh is an outer boundary of the mesh;
   inferring connectivity information between the one or more vertices using the triangulation of the one or more vertices; and
   reconstructing one or more boundary UV coordinates based on the connectivity information, and the one or more boundary UV coordinates are at least part of an internal boundary within the interior of the mesh, the internal boundary being an outer boundary of a hole in the mesh, the hole being entirely within the interior of the mesh and having a polygonal shape comprising n sides, n being greater than 3.

2. The method of claim 1, wherein the one or more vertices located on the boundary of the mesh are losslessly coded.

3. The method of claim 1, wherein the one or more vertices located in the interior of the mesh are sampled.

4. The method of claim 1, further comprising inferring connectivity information between a plurality of neighboring sampled points in the mesh.

5. The method of claim 1, wherein the reconstructed boundary UV coordinates form a hybrid mesh that generates one or more triangles meshes and one or more quad meshes.

6. The method of claim 1, wherein the one or more vertices located on the boundary of the mesh are lossy coded.

7. The method of claim 6, further comprising:
   removing one or more duplicated vertices from a set to create a set of unique boundary vertices;
   recording one or more indices of the one or more duplicated vertices; and
   triangulating the set of unique boundary vertices along with the vertices located in the interior of the mesh that are sampled.

8. An apparatus comprising:
at least one memory configured to store program code; and
at least one processor configured to read the program code and operate as instructed by the program code, the program code comprising:
   receiving code configured to cause the at least one processor to receive a coded video bitstream;
   retrieving code configured to cause the at least one processor to retrieve, from the coded video bitstream, a mesh including a plurality of polygons that describe a surface of a volumetric object;
   first triangulating code configured to cause the at least one processor to triangulate one or more vertices of the mesh, wherein the one or more vertices are located on a boundary of the mesh or interior of the mesh, and the boundary of the mesh is an outer boundary of the mesh;
   inferring code configured to cause the at least one processor to infer connectivity information between the one or more vertices using the triangulation of the one or more vertices; and
   reconstructing code configured to cause the at least one processor to reconstruct one or more boundary UV coordinates based on the connectivity information, and the one or more boundary UV coordinates are at least part of an internal boundary within the interior of the mesh, the internal boundary being an outer boundary of a hole in the mesh, the hole being entirely within the interior of the mesh and having a polygonal shape comprising n sides, n being greater than 3.

9. The apparatus according to claim 8, wherein the one or more vertices located on the boundary of the mesh are losslessly coded.

10. The apparatus according to claim 8, wherein the one or more vertices located in the interior of the mesh are sampled.

11. The method of claim 1, further comprising inferring connectivity information between a plurality of neighboring sampled points in the mesh.

12. The apparatus according to claim 8, wherein the reconstructed boundary UV coordinates form a hybrid mesh that generates one or more triangles meshes and one or more quad meshes.

13. The apparatus according to claim 8, wherein the one or more vertices located on the boundary of the mesh are lossy coded.

14. The apparatus according to claim 13, wherein the program code further includes:
   removing code configured to cause the at least one processor to remove one or more duplicated vertices from a set to create a set of unique boundary vertices;
   recording code configured to cause the at least one processor to record one or more indices of the one or more duplicated vertices; and
   second triangulating code configured to cause the at least one processor to triangulate the set of unique boundary vertices along with the vertices located in the interior of the mesh that are sampled.

15. A non-transitory computer-readable storage medium, storing instructions, which, when executed by at least one processor, cause the at least one processor to:
   receive a coded video bitstream;
   retrieve, from the coded video bitstream, a mesh including a plurality of polygons that describe a surface of a volumetric object;
   triangulate one or more vertices of the mesh, wherein the one or more vertices are located on a boundary of the mesh or interior of the mesh, and the boundary of the mesh is an outer boundary of the mesh;
   infer connectivity information between the one or more vertices using the triangulation of the one or more vertices; and
   reconstruct one or more boundary UV coordinates based on the connectivity information, and the one or more boundary UV coordinates are at least part of an internal boundary within the interior of the mesh, the internal boundary being an outer boundary of a hole in the mesh, the hole being entirely within the interior of the mesh and having a polygonal shape comprising n sides, n being greater than 3.

16. The non-transitory computer-readable storage medium according to claim 15, wherein the one or more vertices located on the boundary of the mesh are losslessly coded.

17. The non-transitory computer-readable storage medium according to claim 15, wherein the one or more vertices located in the interior of the mesh are sampled.

18. The non-transitory computer-readable storage medium according to claim 15, further comprising inferring connectivity information between a plurality of neighboring sampled points in the mesh.

19. The non-transitory computer-readable storage medium according to claim 15, wherein the reconstructed boundary UV coordinates form a hybrid mesh that generates one or more triangles meshes and one or more quad meshes.

20. The non-transitory computer-readable storage medium according to claim 15, wherein the one or more vertices located on the boundary of the mesh are lossy coded.

* * * * *